United States Patent [19]

Lutz et al.

[11] Patent Number: 5,291,600
[45] Date of Patent: Mar. 1, 1994

[54] RECOVERY OF IN-CORE DISK DATA

[75] Inventors: Daniel E. Lutz, Yorkville; Jorge D. Penaranda, Woodridge, both of Ill.

[73] Assignee: AT&T Bell Laboratories, Murray Hill, N.J.

[21] Appl. No.: 780,594

[22] Filed: Oct. 23, 1991

[51] Int. Cl.⁵ .................. G06F 11/00; G06F 12/16
[52] U.S. Cl. .................... 395/700; 364/DIG. 1; 364/280.2; 364/280.3; 364/266.5; 364/245.6; 395/575
[58] Field of Search ........... 395/700, 650, 575, 275, 395/750; 365/200; 364/707

[56] References Cited

U.S. PATENT DOCUMENTS

| | | | |
|---|---|---|---|
| 4,374,415 | 2/1983 | Cormier et al. | 395/275 |
| 4,458,307 | 7/1984 | McAnlis et al. | 364/200 |
| 4,814,971 | 3/1989 | Thatte | 364/200 |
| 4,905,196 | 2/1990 | Kirrmann | 365/200 |
| 4,907,150 | 3/1990 | Arroyo | 395/575 |
| 4,912,628 | 3/1990 | Briggs | 395/650 |
| 5,021,983 | 6/1991 | Nguyen et al. | 364/707 |

OTHER PUBLICATIONS

AT&T 3B2 Computer UNIX System V Release 3 User's and System Administrator's Reference Manual, pp. 1-2 Jun. 1988 (mkfs), pp. 1-3, Apr. 1987 (fsck), and pp. 1-2 Apr. 1987 (mount).
UNIX System V Administration-Advanced Topics UC/CS1046, 2.1.8 Issue 1, "System Crash Recovery-3B2/500 and 3B2/600 Computers", 1988.

Primary Examiner—Eddie P. Chan
Assistant Examiner—K. Spivak
Attorney, Agent, or Firm—Charles L. Warren

[57] ABSTRACT

Upon a computer system crash, the operating system writes data such as stored in an in-core disk to an external nonvolatile disk drive. During a reboot of the system, volatile memory is cleared; and the location of the stored user data in the nonvolatile disk drive is determined. The location of the in-core disk in the nonvolatile disk drive is identified and the in-core disk's data is written back to memory, thereby preventing the loss of the user data due to a system crash.

10 Claims, 4 Drawing Sheets

RECOVERY OF IN-CORE DISK DATA

Technical Field

This invention relates to digital computer systems in which part of its random access memory (RAM) is partitioned to function as an in-core disk and more specifically, relates to the recovery of user data stored in the in-core disk, in the event of a system crash. As used herein "core" memory refers to volatile RAM of all types.

BACKGROUND OF THE INVENTION

Computer applications having frequent read/write operations, such as a database application involving a substantial number of records, can achieve improved time performance by utilizing an in-core disk for temporary data storage instead of a floppy disk or hard disk. The read/write operations between the application program and the in-core disk are very rapid compared to storage on an external storage device. Thus, it is desirable to allocate part of the in-core memory to function as a disk.

A disadvantage associated with in-core disk usage is the possibility that data stored in such a disk will be lost should a system crash occur prior to the contents of the in-core disk being transferred to a nonvolatile memory, such as a conventional floppy disk. It is known that currently available word processing applications permit a user to cause the program to automatically save or update a user file at predetermined time intervals. Thus, the user is assured that only a limited amount of input or work will be lost, in the event of a loss of power or system crash. It will be apparent that this method places the burden upon each application program to provide file protection.

In digital computer systems, it is known to utilize the operating system to write the total contents of core memory to a disk drive upon detection of a system crash. The purpose for saving the contents of the memory in existing digital computer systems upon a crash determination, is to provide a diagnostic tool for analyzing the cause of the crash. Unless user data stored in core memory was saved shortly before the system crash, either by a manual save initiated by the user, or a periodic save under the control of the application program, the user data stored in core is lost.

SUMMARY OF THE INVENTION

It is an object of the present invention to address the previously described shortcomings of protecting user data stored in in-core memory, in the event of a system crash, by providing an operating system function which provides for recovery of this data.

In accordance with the present invention, a method embodying the invention prevents loss of data stored in a predetermined section of volatile memory in a computer system due to a system crash. Upon a system crash occurrence, the computer operating system writes the in-core disk data to a nonvolatile storage device (stored data). During a reboot of the computer system, the computer core memory is cleared. The location at which the stored data resides in the nonvolatile storage device is identified. The address in the in-core disk at which the stored data resided prior to the crash is determined. The stored data is written back to the same address in the in-core disk from its location in the nonvolatile storage device, thereby preventing the loss of the user data resident in the in-core disk.

DETAILED DESCRIPTION

The present invention can be utilized with the operating systems of various digital computers. The exemplary embodiment of the present invention described herein is utilized in a UNIX ® SYSTEM V operating system in an AT&T 3B2 computer. The following flow diagrams describe the illustrated embodiment of the present invention in this environment.

Figure 1:
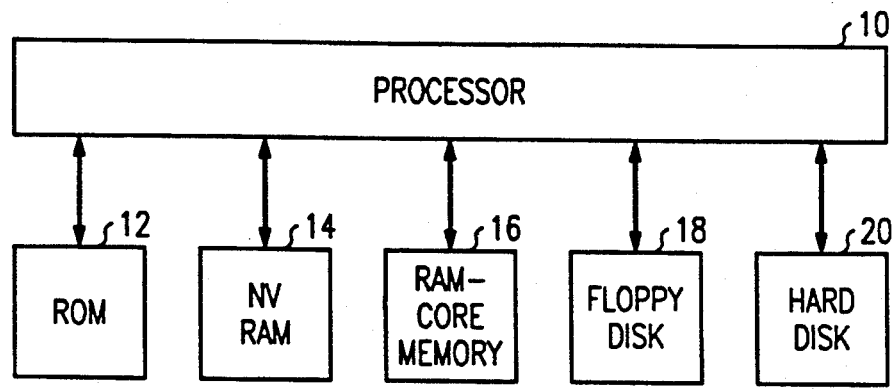
FIG. 1 is a block diagram of a computer system that incorporates an embodiment of the present invention.

In FIG. 1, an illustrative computer system includes processor 10, read-only memory (ROM) 12, core memory consisting of RAM 16, and nonvolatile storage devices including nonvolatile random access memory (NV RAM) 14, floppy disk 18 and hard disk 20. The NV RAM 14 may consist of conventional RAM with battery backup to prevent the loss of memory during a loss of commercially available AC power source.

Figure 2:
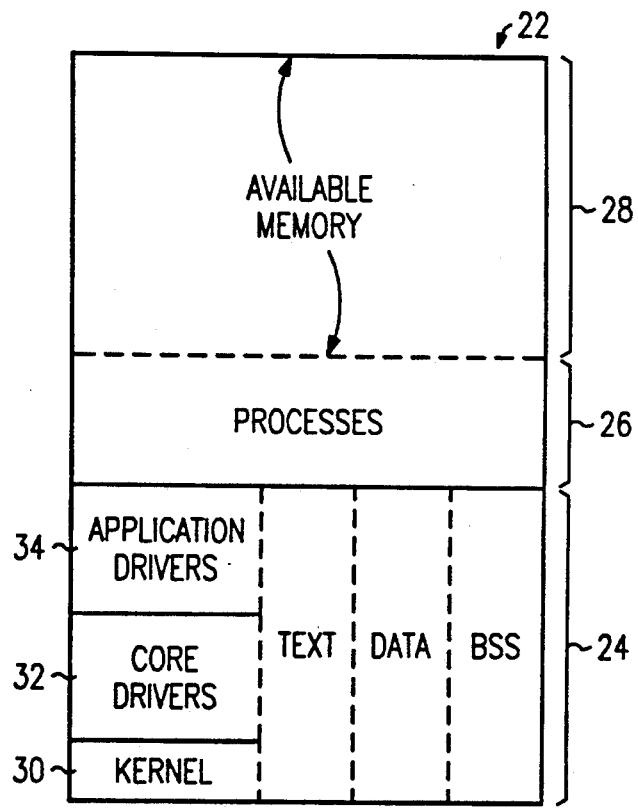
FIG. 2 is a diagram illustrating the core memory as shown in FIG. 1 configured for a conventional computer system.

FIG. 2 illustrates a conventional utilization of a core memory 22. It consists of a root portion 24, a processes portion 26 and an available memory portion 28. The root portion 24, which normally resides in the lower memory addresses, typically consists of kernel 30, core drivers 32 and application drivers 34. Each of elements 30, 32, and 34 may contain text, data, and uninitialized data known as BSS information. The structure, utilization, and functions of these elements are generally well known. The processes portion 26 represents a variety of processes or functions requiring memory utilization ranging from the more basic default system processes required for system operation to higher level processes such as user applications. The dashed line between partitions 26 and 28 indicates that the available memory 28 may expand or contract depending upon the magnitude of the processes.

Figure 3:
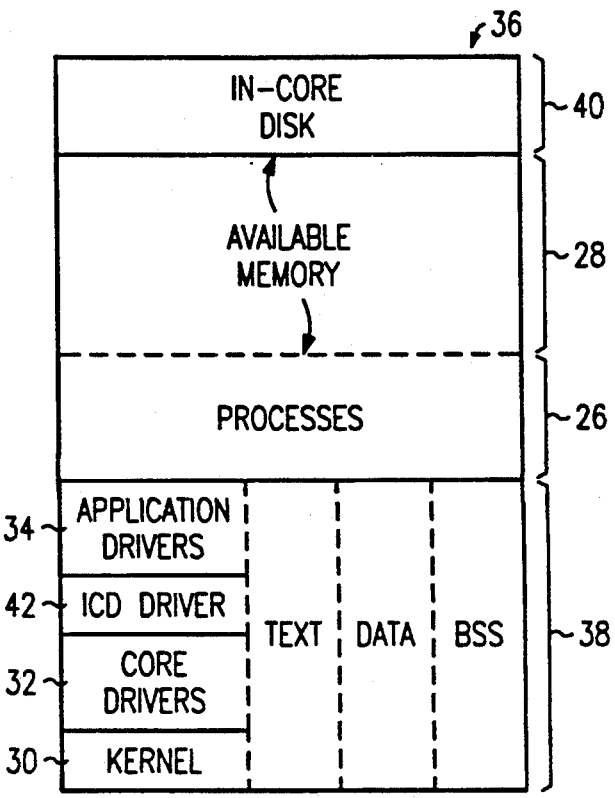
FIG. 3 is a diagram of the core memory of FIG. 1 configured in accordance with an embodiment of the present invention.

FIG. 3 illustrates a configuration of core memory 36 in accordance with the present invention suited for use as core memory 16 as shown in FIG. 1. Like reference numerals in FIG. 3 and FIG. 2 represent common elements. The memory 36 is partitioned into a root portion 38, processes 26, available memory 28, and in-core disk 40. The root portion 38 contains like elements 30, 32, and 34 in common with FIG. 2, and further includes an in-core disk (ICD) driver 42 which defines the beginning and end address of in-core disk 40 and other conventional information enabling the memory configured as in-core disk 40 to be addressed as a device. Although the specific information contained in ICD driver 42 will vary depending upon the particular application and system, it will typically use the same structure and format as other conventional drivers, such as drivers 32 and 34. The structure, format, and use of drivers to enable communications with various devices are generally known. The size of the in-core disk portion 40 is defined by a system administrator. The amount of available memory will increase or decrease depending upon the size of the processes and the in-core disk. The in-core disk is preferably defined as a region adjacent the top of memory. The lower boundary of the in-core disk sets the maximum available memory address available to the system. In a conventional system, the maximum amount of available memory is utilized as illustrated in FIG. 2. However, with the in-core disk, a portion of what would have been available memory, is dedicated for in-core disk use.

Figure 4:
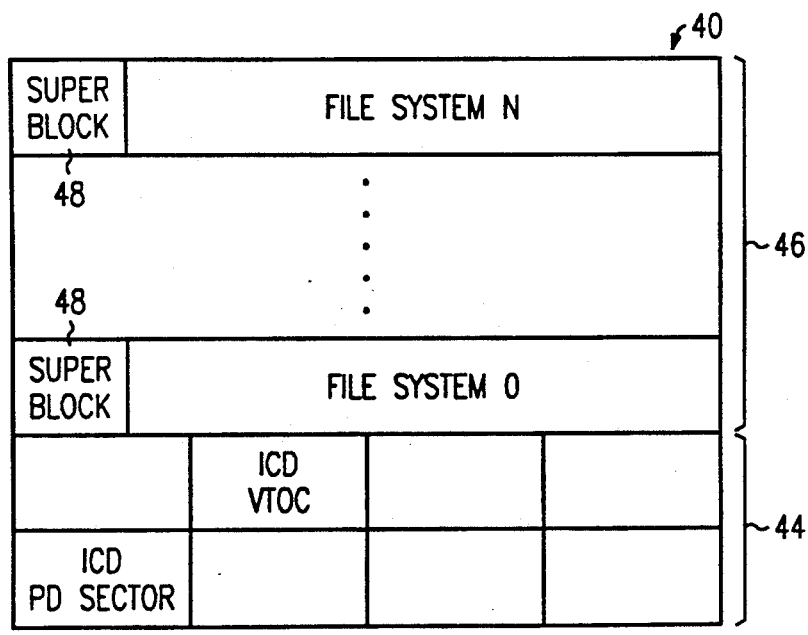
FIG. 4 is a diagram illustrating the configuration of the in-core disk as shown in FIG. 3.

FIG. 4 illustrates the in-core disk 40 in more detail. A plurality of predefined blocks of memory 44 contain status and control information utilized in reading and writing information to the remaining portion 46 of the in-core disk. Information preferably included in memory 44 is in-core disk physical description (PD) sector and ICD volume table of contents (VTOC). Such information is well known with regard to the control of conventional floppy and hard disks and serves the same function for the ICD. The memory portion 46 of the in-core disk may be partitioned into N file systems each containing a super block 48. The super block describes each associated file system and contains information such as the number of free blocks, number of blocks used, and other information relative to the specific file system. Each file system may be addressed as a conventional file as if it were on a floppy or hard disk. The structure and operation of the ICD driver 42, the elements stored in portion 44, and the super blocks 48 are known to those skilled in the art.

Figure 5:
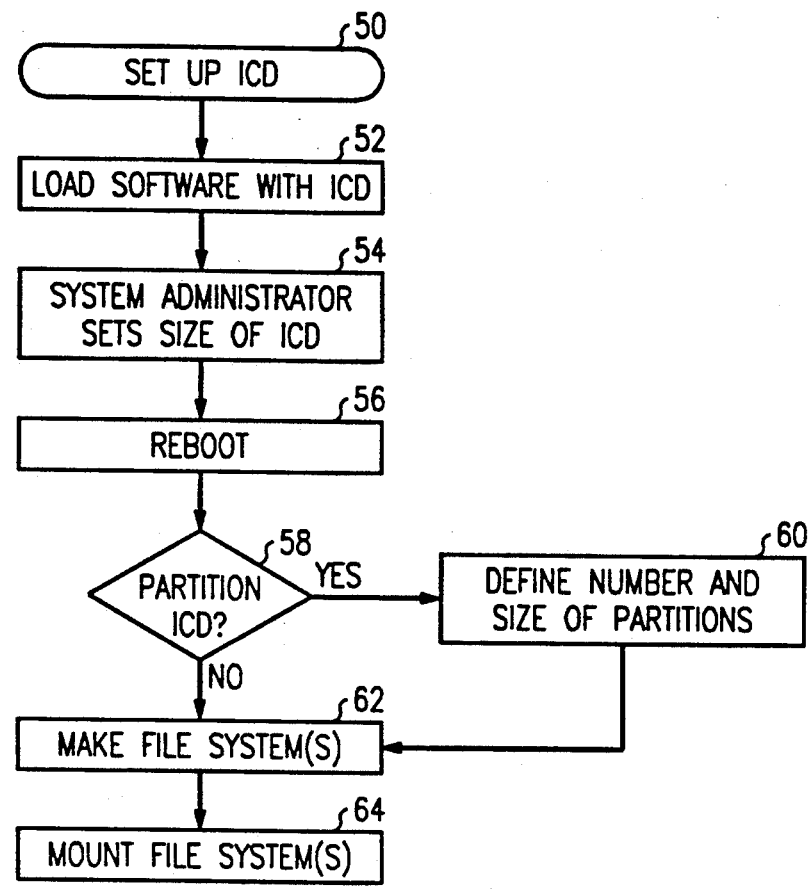
FIG. 5 is a flow diagram illustrating a method for setting up an in-core disk in accordance with an embodiment of the present invention.

In FIG. 5, a method for initially installing an embodiment of the present invention in a UNIX SYSTEM V operating system environment is shown. The method is initiated at the beginning step 50 in which a determination is made to set up an in-core disk including a data recovery mechanism, in accordance with the present invention. In step 52 the software associated with an implementation of the data recovery method of the present invention and the ICD is loaded into the operating system stored on hard disk 20. In step 54 the system administrator sets the size of the ICD by storing a size value in the NV RAM 14 at a predetermined location. Next, in order to reconfigure the computer system to include the ICD and data recovery feature, the system is rebooted at step 56, i.e., the modified operating system is loaded from hard disk 20. In decision step 58, the system administrator makes a determination as to whether the ICD should be partitioned into more than one file system contained in memory portion 46 (see FIG. 4). A NO determination results in all of memory portion 46 containing a single file system 0. Upon a YES determination, the system administrator in step 60 defines the desired number of file systems or partitions and the size of each. This number and size information is stored in the volume table of contents in memory portion 44. Next, the system administrator will utilize the UNIX command "mkfs" to make the file systems, i.e., to create super blocks 48 corresponding to each file system. In order to allow user access through the UNIX directory structure, files are entered into the structure using the UNIX "mount" command. This permits user access through the UNIX directory structure to each file system by a corresponding name. This completes the creation and initialization of an in-core disk which can be utilized in combination with user applications to provide temporary data storage which can be quickly accessed.

Figure 6:
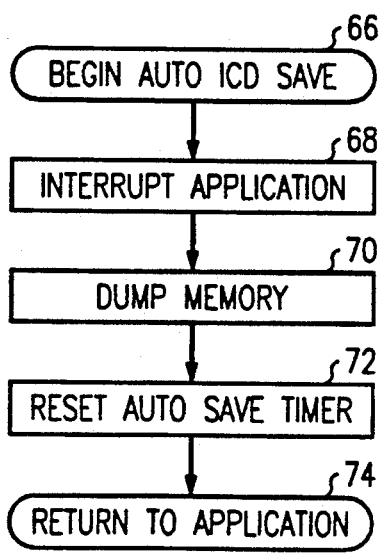
FIG. 6 is a flow diagram illustrating an automatic save feature in accordance with an embodiment of the present invention.

FIG. 6 illustrates a method by which the contents of the in-core disk can be saved to the hard disk at periodic intervals, thereby permitting recovery in the event of an unintentional power loss. Step 66 is the beginning entry to the illustrated method. This method is triggered by an operating system timer (not shown) reaching a predetermined time interval such as 15 or 30 minutes. In step 68, any application programs which may be active, are temporarily interrupted by the operating system. Next, the contents of the in-core disk memory is dumped or saved, as indicated by step 70, to a hard disk or other nonvolatile memory storage device. In step 72, the system timer associated with the predetermined time interval for the automatic save feature is reset. In step 74, this method returns control to the operating system which will allow resumption of application processes.

Figure 7:
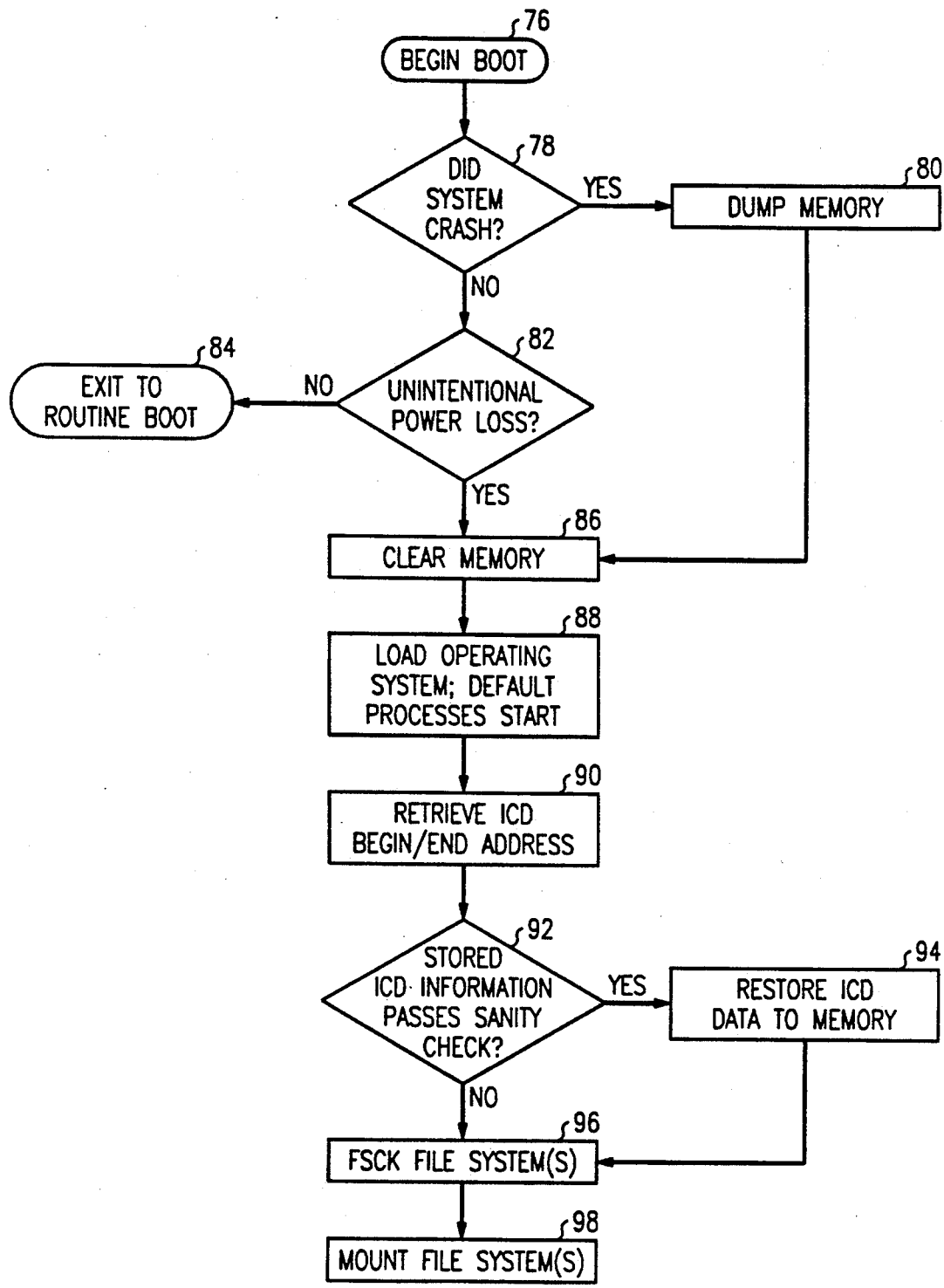
FIG. 7 is a flow diagram illustrating a method in accordance with an embodiment of the present invention for recovering data stored in the in-core disk memory.

FIG. 7 illustrates a method in accordance with the present invention for the recovery of in-core disk data under operating system control. To enter the method at the Begin Boot step 76, the normal processes associated with the operating system will have determined that a system crash, an unrecoverable system condition, or power loss has occurred. Typically, operating systems, including the UNIX operating system, include a number of state flags indicating the status or condition of critical processes, conditions and devices for this purpose. A determination is made in step 78 if a system crash occurred. Upon a YES determination, the content of all core memory is preferably dumped to a hard disk. The saved memory includes the in-core disk memory. At least the ICD contents and ICD structure information is saved to hard disk. A NO determination in step 78 results in a further determination in step 82 as to whether or not an unintentional power loss occurred. Upon a NO determination, this boot process exits to a conventional or routine boot 84 as is known in the art. Upon a YES determination in step 82 or upon completing the memory dump from step 80, all core memory is preferably cleared or initialized by step 86. At least the ICD memory is cleared. Next, the operating system is loaded from hard disk in step 88 and the fundamental default processes are started. Such processes relate to the basic operating system structure and operation. In step 90, the beginning and end in-core memory address of the location of the in-core disk is retrieved from the data kept in the data section of the ICD driver previously stored by the memory dump. The starting address of the ICD points to the PD sector which describes the physical layout of the ICD and contains a pointer to the VTOC. The partitioning of the ICD including the beginning and ending blocks of each partition (file system) is contained in the VTOC. In step 92 a determination is made if the ICD information stored on hard disk is consistent with a sanity check. This check may comprise a comparison of a sanity word stored with the PD sector and VTOC data relative to predefined words that identify different types of data. Upon a YES determination, the ICD data stored in the hard disk is written to the ICD disk memory 40. Step 94 is not executed if step 92 is NO, i.e., the stored information does not pass the sanity check. That is, it would not be useful to rewrite the stored ICD data, since the physical disk sector or VTOC information is incorrect and would thus not allow valid data retrieval. In step 96 the UNIX command "fsck" is executed to check the file systems associated with the in-core disk. This provides a further level of verification of the structural integrity of each file system. Next, the UNIX "mount" command is utilized to link each file system to the UNIX directory structure allowing user access. This completes the exemplary recovery method of ICD data.

The present invention reduces the risks associated with utilization by the user of an in-core disk. An important aspect of the invention resides in its implementation in association with the computer operating system as opposed to an application program. It will be apparent to those skilled in the art that application programs can be designed to read and write temporarily stored data to a hard disk under the control of the application. However, this provides a substantial burden upon each application program. An application implementation has the further disadvantage that operating system controls will take precedence during a system crash condition. Thus, the present invention as configured in the operating system eliminates the need for repetitive features in user application programs. Further, the present invention provides for the automatic restoration of the ICD data without requiring intervention by a person.

Although an exemplary embodiment of the present invention has been described herein and shown in the drawings, the scope of the invention is determined by claims which follow.

What is claimed is:

1. In a computer system having a processor, an operating system, volatile random access core memory, nonvolatile storage device, and a first portion of the core memory (ICD memory) partitioned to function as an in-core disk that controls the storing and retrieving of data, the operating system having an in-core disk driver containing a beginning and end address of the ICD memory and other conventional information for enabling data to be written to and read from the ICD memory in the same way data is written to and read from a disk drive device, a computer implemented method for recovering X data stored in said ICD memory comprising the steps of:

the operating system monitoring for a system crash;

upon a system crash determination, the operating system causing at least the X data stored in said ICD memory and driver data stored in said in-core disk driver to be written to the nonvolatile (NV) storage device which comprises a disk drive;

initializing said core memory;

reloading said operating system;

said operating system locating said in-core disk driver data in the nonvolatile storage device;

said operating system recovering the beginning and end address of the ICD memory from the driver data located in the NV storage device and restoring said in-core disk driver data;

restoring said X data stored in the NV storage device in ICD memory defined by said beginning and end addresses, thereby preventing the loss of the in-core disk data in the event of a system crash.

2. The method according to claim 1 further comprising the steps of:

testing the integrity of the X data stored in said NV storage device; and inhibiting the step of restoring said X data if said integrity test is not passed.

3. The method according to claim 2 further comprising the step of:

the operating system periodically writing the contents of the in-core disk to the nonvolatile storage device.

4. The method according to claim 1 wherein said causing step comprises writing all of the data stored in the random access core memory to the nonvolatile storage device.

5. The method according to claim 1 further comprising the step of the operating system periodically writing the contents of the in-core disk and of the in-core disk driver to the nonvolatile storage device to permit the recovery of said contents in the event an operating system problem occurs which is not detected as a system crash.

6. In a computer system having a processor, an operating system, volatile random access core memory, nonvolatile storage device, and a first portion of the core memory (ICD memory) partitioned to function as an in-core disk that controls the storing and retrieving of data, the operating system having an in-core disk driver containing a beginning and end address of the ICD memory and other conventional information for enabling data to be written to and read from the ICD memory in the same way data is written to and read from a disk drive device, the improvement comprising:

monitoring means for monitoring for a system crash;

writing means, responsive to said monitoring means making a system crash determination, for causing at least X data stored in said ICD memory and driver data stored in said in-core disk driver to be written to the nonvolatile (NV) storage device which comprises a disk drive device;

initializing means responsive to said writing means storing said X data in the disk drive device for initializing said core memory and reloading said operating system;

locating means responsive to said initializing means reloading said operating system for locating said driver data in the nonvolatile storage device;

recovery means responsive to said locating means locating said driver data for recovering the beginning and end address of the ICD memory from the driver data located in the NV stored data and restoring said driver data;

restoring means responsive to said recovery means recovering said beginning and end address for restoring said X data stored in the NV storage device in ICD memory defined by said beginning and end addresses, thereby preventing the loss of the in-core disk data in the event of a system crash.

7. The system according to claim 6 further comprising:

testing means for testing the integrity of the X data stored in said NV storage device prior to said restoring means restoring said X data; and inhibiting means responsive to said testing means for inhibiting the restoring of the X data if said integrity test is not passed.

8. The system according to claim 7 further comprising periodic writing means for periodically writing the contents of the in-core disk to the nonvolatile storage device.

9. The system according to claim 8 wherein said writing means comprises means for writing all of the data stored in the random access core memory to the nonvolatile storage device.

10. The system according to claim 8 further comprising periodic writing means for periodically writing the contents of the in-core disk and driver data to the nonvolatile storage device to permit the recovery of said contents in the event an operating system problem occurs which is not detected as a system crash.

* * * * *